Howard O. McMahon
George Feick III
INVENTORS

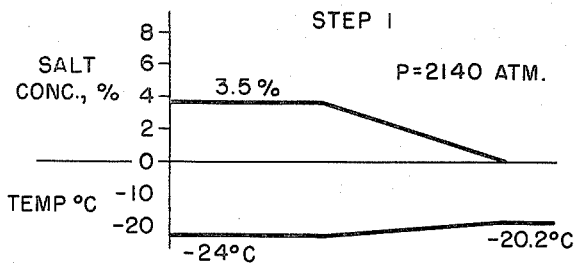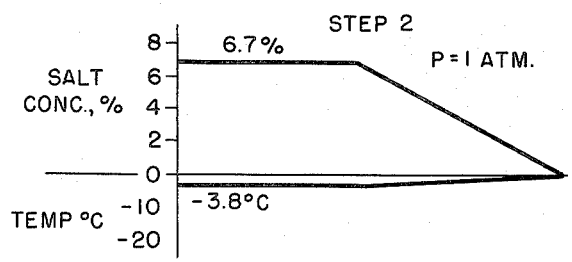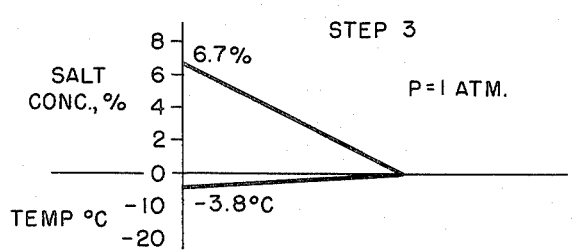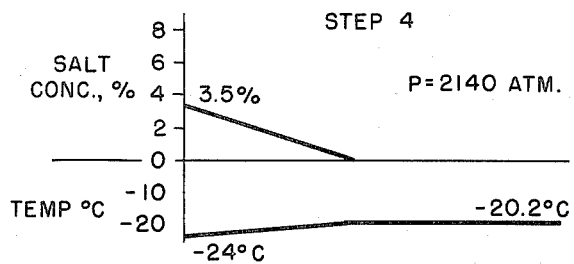
DISTANCE FROM BOTTOM TO TOP OF COLUMN

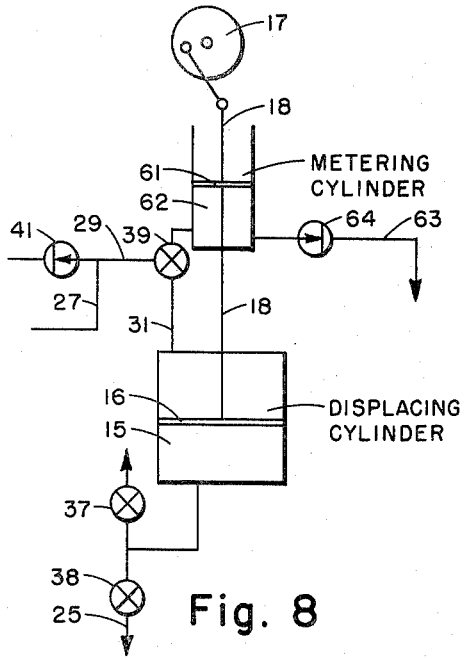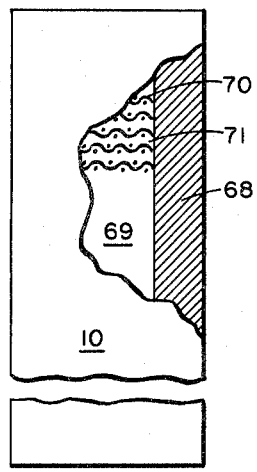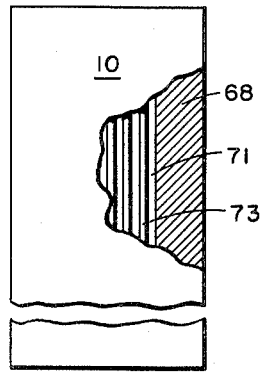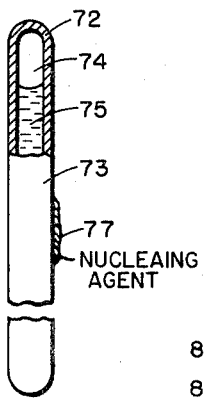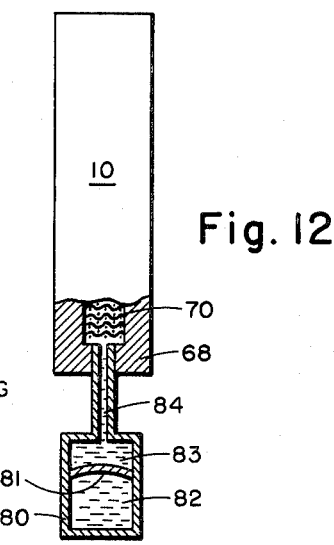

Howard O. McMahon
George Feick III
INVENTORS

Feb. 15, 1966  H. O. McMAHON ET AL  3,234,747
CRYSTAL FORMING AND MELTING BY VARYING APPLIED PRESSURE
Filed July 3, 1961  6 Sheets-Sheet 6

|  | | STEP 1 | STEP 2 | STEP 3 | STEP 4 |
|---|---|---|---|---|---|
| VALVE (FIG. 14) | 120 | C * | O ** | C | C |
|  | 121 | C | C | C | O |
|  | 122 | O | O | O | C |
|  | 123 | C | C | C | O |
|  | 124 | C | C | C | O |
|  | 125 | O | C | C | O |
|  | 126 | C | O | O | C |
|  | 127 | SEE TEXT | | | |
|  | 128 | | | | |

* C - CLOSED
** O - OPEN

Howard O. McMahon
George Feick III
INVENTORS

BY [signature]
Attorney

United States Patent Office 3,234,747
Patented Feb. 15, 1966

3,234,747
CRYSTAL FORMING AND MELTING BY VARYING APPLIED PRESSURE
Howard O. McMahon, Lexington, and George Feick III, Needham, Mass., assignors to Arthur D. Little, Inc., Cambridge, Mass., a corporation of Massachusetts
Filed July 3, 1961, Ser. No. 121,493
6 Claims. (Cl. 62—58)

This invention relates to method and apparatus for separating liquids and more particularly to the separation of a noneutectic system, the freezing point of which is altered by application of pressure.

The necessity for separating a liquid mixture into two or more components arises in many different types of processes. As examples, we may cite the production of potable water from sea water, the concentration of flavor constituents in the manufacture of concentrated fruit juices, the separation of industrially produced materials into constituents such as the separation of xylene isomers, and the separation of liquefied gases.

Although many processes have been proposed for the separation of noneutectic liquid mixtures into two or more constituents, distillation techniques have most generally been applied to the problem. Distillation equipment, however, is necessarily bulky because it must be designed to handle both liquid and gaseous phases. The distillation process for the purification of sea water has moreover proven too costly for large-scale operation in many localities because of the large power requirements. In addition, in the process of heating and volatilization to achieve distillation, it is possible to lose valuable components. This is particularly true in the concentration of such edible materials as fruit juices, for vaporization is attended by loss of valuable flavor constituents.

In the preparation of fresh water from sea water, any process for large-scale use must be economical. This factor of economy has now become the primary criterion in developing any water purification system for large-scale use, and it puts demands upon the efficiency of any water separation apparatus and method. Economy is, of course, also of prime importance in industrial processes.

It is, therefore, desirable to have method and apparatus capable of efficiently and economically separating a mixture of components which is a liquid or which can be converted to a liquid, either by melting with heat or liquefying with refrigeration. Moreover, it is also desirable to have such an apparatus and method which would be applicable to the production of fresh water from sea water and which would be at the same time sufficiently attractive economically to make it applicable to large-scale use.

We have found that liquids of the character described can be economically separated by a process which comprises the steps of converting a portion of the mixture to the solid phase by altering the pressure in the mixture in liquid form, displacing the residual liquid with a liquid having a composition approximating that of the solid phase while maintaining the solid phase essentially immobile, and subsequently converting the solid phase to a liquid. It will be seen that this cycle involves a phase change from liquid to solid and then to liquid again. By eliminating any vaporization and subsequent condensation, the energy required for separation of the components is materially reduced. As an example of the improved efficiency achieved by this invention, it may be noted that 970/3 B.t.u.'s are required to vaporize one pound of water at 212° F., while only 143.35 B.t.u.'s are required to be removed to freeze a pound of water at 32° F.

It is, therefore, a primary object of this invention to provide method and apparatus for efficiently and economically separating a liquid mixture into at least two components. It is another object to provide method and apparatus of the character described which involve handling only the condensed phases, thus eliminating the apparatus and steps involved in vaporizing and condensing gases formed while providing a highly efficient cycle.

It is still another object of this invention to provide method and apparatus which are flexible in that they can be applied to liquid mixtures which will expand or contract on solidification, thus making it applicable to aqueous as well as nonaqueous systems. It is yet another object of this invention to provide method and apparatus of the character described which are applicable to mixture which are convertible to a liquid whether by heat or by refrigeration.

These and other objects will become apparent in the following description of this invention.

The method and apparatus of this invention will be described in detail with reference to the accompanying drawings in which FIG. 1 is a schematic flow diagram for separating a liquid mixture which expands with solidification, e.g., water;

FIGS. 3–6 are plots of temperature and liquid composition within the column for the liquids of the method of FIG. 1;

FIG. 8 is a schematic diagram of one type of apparatus that can be used to meter the flow of the product liquid;

FIG. 9 is a view partly in cross section of a suitable pressure column with a heat storage medium;

FIG. 10 is a view partly in cross section of a pressure column with another type of heat storage medium;

FIG. 11 is a typical tubular packing for the pressure column illustrating the use of a nucleating agent;

FIG. 12 illustrates apparatus suitable for agitating the contents of the column;

Figure 14:
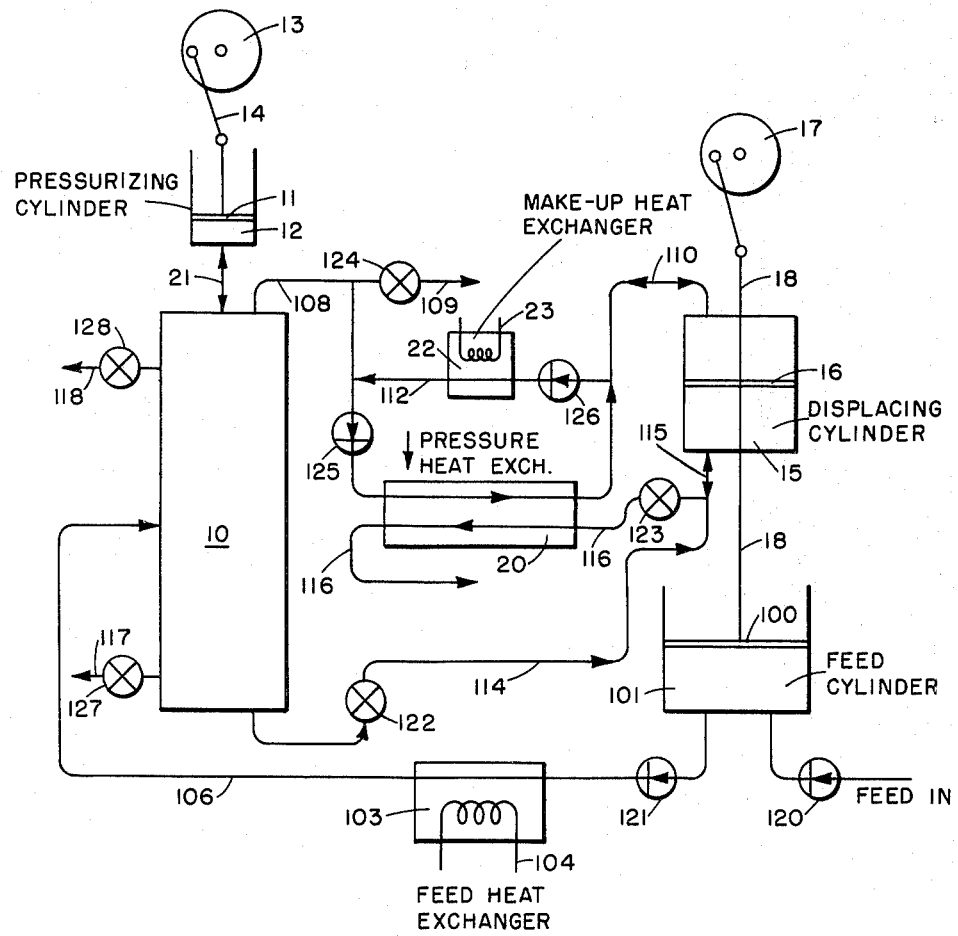
FIG. 14 is a schematic flow diagram for a liquid mixture which contracts upon solidification, e.g., a mixture of xylene isomers.
Figures 13, 15:
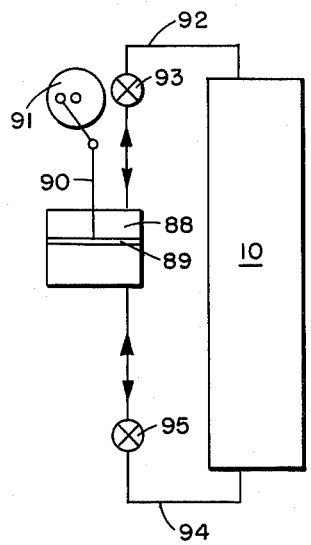
FIG. 13 illustrates another modification of apparatus suitable for agitating the contents of the column.
FIG. 15 is a schematic representation of the movement of the pistons for the cycle of FIG. 15 and the operation of the valves.

In the drawings, FIGS. 1–13 are directed to the illustration of the method and apparatus of this invention for separating aqueous liquids; while FIGS. 14 and 15 are directed to the illustration of the method and apparatus to nonaqueous liquids, that is, liquids which contact upon solidification. However, the modifications of the apparatus shown in FIGS. 8–13 are applicable to the apparatus of FIG. 14 as well as to the method and apparatus of FIG. 1.

Figure 1:
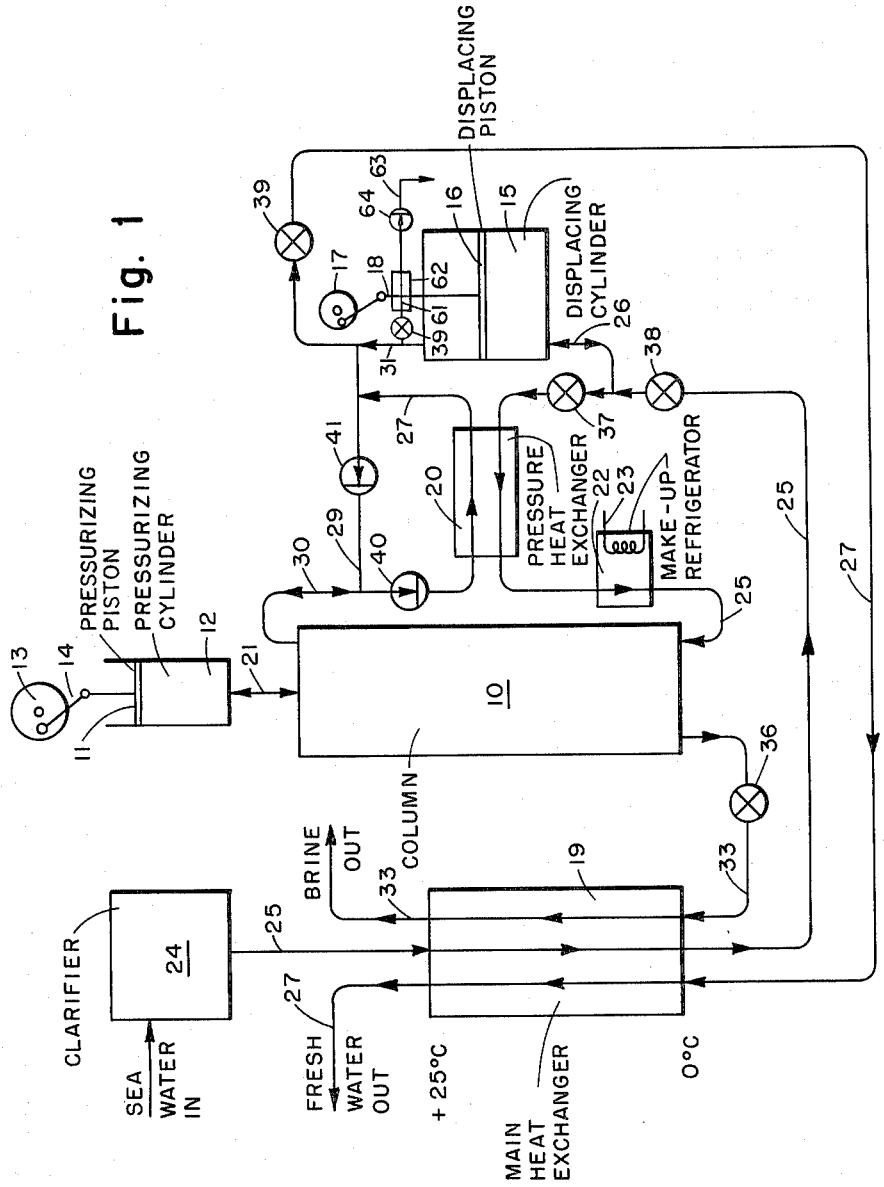

The method and apparatus of this invention will be described in detail first with respect to its application to aqueous systems in which solidification is accompanied by expansion. Hence, the application of pressure can be used to convert the solid phase to the liquid phase and the release of pressure can be used to freeze the liquid phase. FIG. 1 represents in diagrammatic fashion an embodiment of the apparatus of this invention which is applicable to the separation of aqueous liquids. For purposes of illustration, the separation of sea water into a potable or fresh water component and a concentrated brine component will be presented. The apparatus and method to be described in detail is, of course, also equally adaptable to the separation of other aqueous liquids such as fruit juices and the like or to any liquid mixture which expands upon solidification and which is made up of components having different freezing points under the pressure conditions employed in the process.

The process of the invention as it is applied to the separation of sea water may now be described in detail with respect to the apparatus shown in FIG. 1 and the diagrams of FIGS. 2–6, FIG. 2 being a representation of the movement of the pressurizing piston and displacer piston and an indication of the position of the valves during the various steps, while FIGS. 3–6 are plots of temperature and salt concentration as they exist within a typical pressure column. The cycle as it is applied to the operation of the apparatus of FIG. 1 consists of four steps as
 (a) Releasing and freezing;
 (b) Downward displacement of liquid contents;
 (c) Compressing and melting; and
 (d) Upward displacement of liquid contents with product removal.

In the following description, the initial state of the system will be chosen as that which exists after the last of the above steps has taken place.

Before describing the steps of the process in detail, it will be convenient to identify the apparatus components of FIG. 1. In the arrangement illustrated, there is provided a pressure column 10 which is capable of handling the liquid feed mixture under relatively high pressures. Pressure is applied to the pressure column 10 by means of a pressurizing cylinder 12 having a piston 11 which is driven by a suitable drive wheel 13 through rod 14. Communication between the pressurizing cylinder 12 and pressure column 10 is through conduit 21.

The control of the flow of liquid in and out of pressure column 10 is achieved through the use of a displacing cylinder 15 having piston 16 which is moved by a suitable driving means 17 through a connecting rod 18.

In order to keep the system as efficient as possible, it is desirable to maintain the liquids within the pressure column 10 within very close temperature tolerances and this is achieved through the use of several heat exchangers. Main heat exchanger 19 is used to cool the liquid feed mixture as it enters the system by out-of-contact heat exchange with the components leaving the system, e.g., the pure product and brine. A pressure heat exchanger 20 and make-up refrigerator 22 into which a suitable coolant is introduced through coils 23, are provided and their use in the cycle will be described in detail below. The pressure heat exchanger 20 may be any countercurrent heat exchanger capable of operating at the high pressures encountered in the system and process as described below. The system in FIG. 1 is also provided with a clarifier 24. Any suitable means for removing undesirable solids and the like from the liquid feed may be used as the clarifier.

The liquid feed mixture enters through conduit 25 passing through main heat exchanger 19 through pressure heat exchanger 20 and through make-up refrigerator 22. There is provided a branch conduit 26 from conduit 25 which is directly connected to displacing cylinder 15. Pure product is removed from the system by way of conduit 27 which passes through pressure heat exchanger 20 and which has branch conduits 29, 30 and 31, the use of which will be apparent later. Finally, the concentrated brine leaves the system through conduit 33 which also passes through main heat exchanger 19. Valves 36–41 are provided in the various lines described and their role in the process will become apparent in the following description of the cycle.

To begin this cycle for handling a liquid which expands on freezing, assume that the pressurizing piston is at the bottom of its stroke producing high pressure on the liquid in pressure column 10 and maintaining it in the liquid state. Valves 36, 38 and 39 are closed and valve 37 is open. The piston 16 in the displacing cylinder 15 is at the bottom of its stroke and the displacing cylinder 15 is filled with fresh water (i.e., with the higher freezing point component). Thus it will be seen that the system is in a condition corresponding to the end of step 4 illustrated in FIG. 2 and is ready to begin step 1 of the cycle outline.

The concentration and temperature profiles within the column at the beginning of the first steps are shown in FIG. 3. It will be appreciated that FIGS. 3–6 are quite schematic and that the length of the column is a relative quantity. In the following illustration using sea water as the liquid feed mixture and taking pure water and concentrated brine as the two components into which the liquid feed mixture is to be separated, it will be assumed that a pressure of 2,140 atmospheres can be maintained within the pressure column 10. At this pressure, pure water freezes at about −22.2° C. and sea water containing 3.5% salts by weight may be assumed to freeze at about −24° C. for the purpose of this example.

Figure 2:
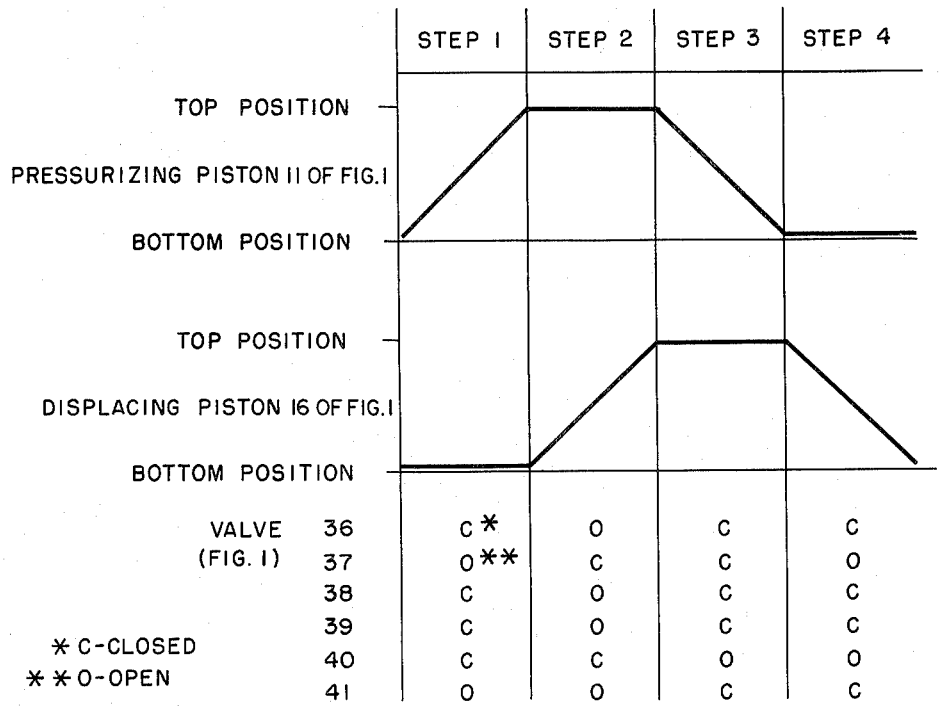
FIG. 2 is a schematic representation of the movement of the pistons for the cycle of FIG. 1 and the operation of the valves.

In FIG. 3 it will be seen that the situation which obtains in the pressure column at the beginning of the cycle as outlined in FIG. 2 will be as follows: in the bottom portion of the column sea water having a salt concentration of about 3.5% will be present and will be maintained at a temperature of about −24° C. About half way up the column a temperature and salt concentration gradient will begin and will extend toward the top of the column where there will be some pure water at −20.2° C. It is now possible to begin the cycle with the movement of the pressurizing and displacing pistons as described in FIG. 2.

Step 1 consists of releasing pressure by moving piston 11 to the top of its stroke and freezing a portion of the liquid. By reducing the pressure in the column, a portion of the liquid is permitted to freeze and form a solid phase enriched in the higher freezing point liquid but normally containing some occluded impurity liquid. In this step, valves 36, 38, 39 and 40 remain closed, while valves 37 and 41 are open; and the displacing cylinder remains at the bottom of its stroke. During this step, the pressure in the column may be reduced to substantially atmospheric pressure or to slightly above atmospheric pressure to prevent the formation of bubbles due to the release of dissolved air in freezing.

In a preferred embodiment of this invention, the solid phase is formed and held immobile on a packing material which is uniformly distributed within pressure column 10. This packing material is preferably a fixed, liquid-permeable heat storage medium which is capable of storing and releasing heat under the temperature conditions of the process. Formation of the solid phase on the surface of a heat storage medium insures immobilization of the solid phase for subsequent washing to remove the occluded impurity liquid and provides for efficient heat exchange within pressure column 10. In the solidifying process the solid phase which results remains fixed in the form of small solid entities on the surface of the liquid-permeable, porous material making up the fixed heat storage medium. This permits the liquid phase to be moved within the column, first in one direction and then in another. Thus never throughout any section of the column are the entire contents converted to the solid phase which would block this liquid flow. The heat released in freezing warms the contents of the column which includes the liquid components as well as the heat storage medium. It will be appreciated also that by storing heat or releasing it, the heat storage medium enables a great amount of heat to be transfered over a given temperature range. This, in turn, means that there results an increase in the fraction of column contents which can be frozen through a given temperature or pressure change.

At the end of the first step and the beginning of the second, the temperature and concentration profiles of the liquid and solid phases in the column are those which are illustrated in FIG. 4. It will be seen in this figure that the liquid in essentially the bottom half of the column has been concentrated with respect to salt content and that some pure water has solidified on the surface of the heat storage medium throughout the column, producing a rise in temperature. Thus, there exists within the column a solid phase which, although it is not completely pure water free from salt impurities, it has a salt concentration considerably less than was present in the liquid feed mixture. In order to purify this solid phase, it is necessary to wash the solid with pure product. This is accomplished in the next step of the process.

In step 2, valves 36, 38, 39 and 41 are open, while valves 37 and 40 are closed. During this step, the pressurizing piston 11 remains at the top of its stroke and the displacing piston 16 in the displacing cylinder 15 which contains pure water, is moved upward. With the upward movement of the displacing piston, a portion of the fresh water or pure product thus displaced is removed to product storage through valve 39 and main heat exchanger 19. The metering of the pure product may be conveniently accomplished by a small metering cylinder such as shown in FIG. 8, described below. The remainder of the fresh water or pure product enters the column through check valve 41, displacing an equal volume of brine from the bottom of the column which is drawn off through conduit 33 through valve 36 which is open. This cold brine also passes through main heat exchanger 19, and along with the pure product leaving through conduit 27, serves to cool the incoming feed liquid entering through conduit 25. During the interchange of the liquids in column 10 of this step, the solid phase formed in the first step is prevented from moving by the presence of the packing or heat storage medium in the column. During this step, the lower part of the displacing cylinder is filled with fresh liquid feed mixture entering through the main heat exchanger 19 by way of conduit 25 and valve C.

In this second step, as the pure or wash product enters the pressure column and displaces concentrated residual liquid, the flow of liquid over the solid phase is downwardly (in this example) and the liquid which thus comes in contact with the solid phase has a composition which is more nearly that of the solid phase than was the liquid surrounding it when it was formed. Thus in effect, in this step there is introduced a quantity of liquid, the composition of which is more nearly that of the solid phase.

FIG. 5 illustrates the temperature and salt concentrations of the liquids present in the pressure column 10 at the end of this step. It will be seen that there exists through the bottom half of the column a temperature and concentration gradient and that essentially the top half comprises pure product maintained at substantially its freezing or solidification point. The pressure within the column remains at atmospheric pressure.

Since it is desirable to remove the pure product in the form of a liquid, it is now necessary to melt the solid phase by the application of pressure. This is accomplished in the third step. In this third step, the pressurizing piston is moved down thus raising the pressure in the pressure cylinder 10 and melting the solid phase in the column. The heat of fusion is supplied by the cooling of the contents of the column including the packing or heat storage medium. During this step, the displacing piston 16 remains stationary except for a small movement due to the compressibility of the liquid beneath it. In this step, valves 36, 37, 38, 39, and 41 are closed and only valve 40 remains open. After the required pressure has been applied to the contents of the pressure column 10, the temperature and concentration profiles within the column may be represented as in FIG. 6. All of the material in the column has been restored to a liquid phase, a salt concentration gradient exists upwardly from the bottom of the cylinder to somewhat less than half the length of the column, while the top portion of the column contains pure liquid. The pure liquid is now in condition to be removed in the next step.

In the final or fourth step, valves 37 and 40 are open while valves 36, 38, 39 and 41 are closed. The pressurizing piston 11 remains at the bottom of its stroke while the displacing piston 16 is moved to its bottom-most position during the step. In its movement downward, the displacing piston draws a charge of pure product or fresh water through the top of the column through check valve 40 and the pressure heat exchanger 20. By passage through the exchanger, the fresh water is warmed from −20° C. to 0° C. by heat exchange with liquid feed mixture entering the bottom of pressure column 10 through conduit 25 and valve 37. In order to introduce the liquid feed mixture at the lowest workable temperature, it is passed also through a make-up refrigerator 22 which achieves out-of-contact heat exchange with a coolant introduced through coil 23. In passing through the pressure heat exchanger, the fresh water is cooled from about 0° C. to about −20° C. in the pressure heat exchanger 20 and then further cooled to about −24° C. by the make-up refrigerator 22.

The system has now been restored to its initial state which existed at the beginning of the cycle and it is ready to begin another cycle. The temperature and concentration profiles in the pressure column 10 are those which are shown in FIG. 3 and are those which have been discussed above.

It will be appreciated that in like manner other systems which expand upon freezing and which can be converted to a liquid under the pressure and temperature at which they are introduced into the pressure column 10 can also be separated so long as the freezing point is depressed with the application of pressure. It is also, of course, within the scope of this invention to separate such materials which are normally solids at room temperature and which can be converted to liquids by heating. The heat exchange systems illustrated in FIG. 1 will then, of course, be changed to achieve the necessary heat exchange and to maintain the material in the liquid state at the pressure at which it is introduced into the pressure column 10.

The above description of the cycle of this invention indicates that it is necessary to be able to control and to coordinate the operation of the pressurizing cylinder 12 and the displacing cylinder 15 along with their respective pistons 11 and 16. Because of the relatively large pressures required in the pressure column 10, the pressurizing cylinder must be capable of handling a comparatively large load compared to that required of the displacing cylinder. It is, however, necessary to completely coordinate the operation of these two cylinders and their pistons as illustrated in FIG. 2 above. It is, therefore, necessary to supply apparatus which is capable of furnishing two widely varying work loads, preferably from the same power source and off the same power shaft.

In the operation of the apparatus of FIG. 1 (as well as that of FIG. 14) it will also be necessary to control the operation of the various valves since through them the the liquid flow is regulated and the required conditions of temperature and pressure are maintained. The operation, control and coordination of the valves may be effected by any suitable means which are electrically, hydraulically or mechanically operated. Any combination of these methods is also, of course, within the scope of this invention.

Figure 7:
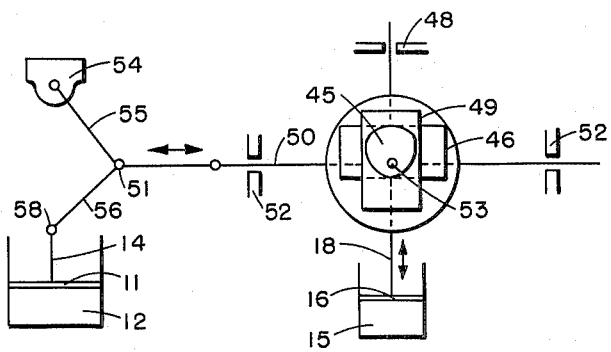
FIG. 7 is a schematic diagram of one type of apparatus that can be used to move the pressurizing and displacing cylinders.

A suitable apparatus for accomplishing control and coordination of the cylinder pistons is illustrated in FIG. 7. In this arrangement, there is provided a main power shaft 53 on which is mounted a suitably shaped cam 45. The cam has two rectangular followers, one of them being 46 which is designed to operate the piston 16 of the displacer cylinder 15. It accomplishes this through piston rod 18 which is mounted on suitable bearings such as 48. Thus it is possible to give the necessary up and down motion to piston 16 in displacer cylinder 15.

The second cam follower associated with cam 45 is also a rectangular cam follower designated as 49 and rotated 90° with respect to cam follower 46. It will be appreciated that this cam follower 49 imparts to shaft 50 a horizontal motion. This shaft 50 is mechanically connected to a toggle joint 51 and it is mounted in suitable bearings such as 52. The toggle in turn is attached to a fixed joint 54 through rod 55, and through rod 56 it is mechanically joined to main piston shaft 14 at a suitable point 58. Thus it will be seen that cam 45 in imparting a horizontal motion to shaft 50 is capable of applying a large amount of pressure to piston shaft 14 and hence to piston 11 of pressurizing cylinder 12. Any other suitable mechanical, hydraulic or electrical device which accomplishes the necessary control and coordination of the working of the two cylinders is, of course, also suitable for the apparatus of this invention.

In the cycle described above in connection with FIG. 1, a portion of the pure liquid was drawn off as product while the remaining portion was retained for returning through branch conduits 29 and 30 to the cycle for the purpose of washing the solid phase formed on the heat storage medium. In order to draw off a given quantity of pure product from the system, it is necessary to provide means for metering a predetermined amount for removal. An apparatus suitable for metering out this quantity and returning the remainder to the cycle is shown in FIG. 8. In this figure, like numbers refer to like elements in FIG. 1.

In FIG. 8, it will be seen that the metering cylinder 62 of this apparatus is directly connected to the displacing cylinder and may be operated off the same shaft 18 as that which operates the displacing piston 16. It is, therefore, coordinated with the operation of the displacing cylinder 15. The metering apparatus in FIG. 8 comprises a metering cylinder 62 having a piston 61 which is movable up and down in a coordinated fashion with the piston 16 of displacing cylinder 15. Pure water which is drawn out of the pressure column 10 through valve 41 by the downward displacement of piston 16 is then directed by control of valve 39 into displacing cylinder 15 and into the metering cylinder 62. That portion of the pure product which is to be returned through main heat exchanger 19 to be removed as product is directed through conduit 63 which is controlled by a one-way feed valve 64. By proper control of valves 39 and 64 and the proper adjustment in the volume of metering cylinder 62, it is possible to control the amount of pure product which is withheld for returning to the cycle and the amount which is taken out of the system.

One of the important components of the apparatus of this invention is the heat storage medium which is evenly distributed within and partially fills the pressure column 10. The description of the cycle of this invention above indicated the role played by this heat storage medium. Along with the liquid contents of the column, this heat storage material serves as a means for storing and releasing heat during the steps. As noted above, it also serves to furnish a very large surface area on which the solid phase can form and on which the solid phase is immobilized during the step in which pure product liquid is introduced to wash the solid phase in removing occluded impurity liquid.

The heat storage medium is preferably formed of a material which has a high heat capacity per unit volume within the temperature range over which the pressure column is to operate. Among the common structural materials, nickel and cobalt are especially desirable in this respect while iron, copper, beryllium, chromium, platinum, manganese and rhodium also are desirable from this point of view. It is of course possible to use alloys or clad materials or to incoporate in metals various substances of high heat capacity which might otherwise be reactive with or soluble in the liquid mixture under treatment.

The heat storage medium may assume many different configurations, two examples of which are shown in FIGS. 9 and 10. In FIG. 9, a portion of a pressure column 10 is shown partially in a cut-away view. The walls of the column 68 are, of course, relatively thick to withstand the extremely high pressures which must be applied to the liquid contained therein. Within pressure column 10, there is defined a space 69 in which the heat storage medium is shown to be fine screening. Between the screens, is a space 71 which is occupied by the contents of the column, e.g., liquid and solid.

In like manner, the heat storage medium may be bundles of parallel rods or tubes such as shown in FIG. 10. In this figure, the tubes 71 are spaced apart leaving narrow channels 73 to be occupied by the liquid and solid content of the column.

A modification of the tubes 71 of FIG. 10 serving as the heat storage medium, as illustrated in FIG. 11 in which a tube 73 is formed by an outside wall 72 which defines therein a space 74 which is at least partially filled with a heat transfer liquid 75 which will undergo a phase change within the temperature range over which the column is operated, the latent heat of such phase change serving to enhance the heat storage effect. Such heat transfer liquids should have a melting point (or other transition point) lying between the limits of temperature variations of the column.

For aqueous solutions, the liquid may be water to which has been added an amount to a soluble material (various salts, ethanol, methanol and the like) sufficient to depress its melting point a few degrees. Alternatively, a pure liquid of the desired freezing point such as t-amyl alcohol (melting point $-11.9°$ C.), aniline (melting point $-6.2°$ C.) or ethylene glycol (melting point $-17.4°$ C.) may be used. For other temperature ranges other filling materials will be known to those skilled in the art.

In FIG. 11, another modification of the tube as a heat storage medium is illustrated. In this modification, a nucleating agent 77 for the solid phase is deposited on the tubing surface. For example, in the case of water purification, the nucleating agent may be silver iodide. In like manner, other heat storage mediums such as perforated discs, fine shot, metallic filings, or granulated metallic or nonmetallic materials which possess the required thermal properties may be used in the same manner as illustrated for the screens and tubes in FIGS. 9 and 10. Any of these may, of course, be treated with a suitable nucleating agent. It is preferred that the heat storage medium be of a finely dispersed material having a large surface area and that this heat storage medium be uniformly distributed within the pressure column.

One of the factors in determining the speed of cycling, that is the rate at which the steps outlined above may be carried out, is the rate at which the solid phase can be formed without excessive dendritic growth and entrapment of impurities. The heat storage medium in the pressure column materially contributes to the necessary heat transfer which must be effected within the column and contributes to the rate of solid formation. Another modification in the process and apparatus which may be employed to maximize the freezing rate is the gentle agitation of the contents of the column. Gentle agitation of the liquid in the pressure column may be accomplished first by rapidly oscillating the displacing cylinder within a very narrow displacement range. Agitation may also be accomplished by auxiliary equipment such as that shown in FIGS. 12 and 13, for example. In FIG. 12, there is illustrated the use of a small auxiliary chamber 80 which is equipped with a flexible diaphragm or bellows 81, the later dividing the chamber 80 into two liquid-tight compartments. Into the bottom compartment 82 is placed a compressible liquid, for example a silicone oil, while the upper portion 83 of the chamber is connected directly through a suitable conduit 84 with the liquid in the pressure column 10. Change of pressure in pressure column 10 induces movement of flexible diaphragm 81, thus gently agitating the liquid in pressure column 10.

FIG. 13 shows another type of auxiliary equipment which may be incorporated into the apparatus for agitating the contents of pressure column 10. This is achieved through the use of an auxiliary displacing cylinder 88 having a piston 89 which is driven through shaft 90 by a suitable driving means 91. The cylinder is connected with the top and bottom of the pressure column such as by conduit 92 having a valve 93, and by conduit 94 having valve 95. By proper control of valves 93 and 94, liquid may be caused to flow in either direction and when the displacing piston 89 is rapidly oscillating gentle agitation of the liquid in the column is obtained.

The process and apparatus of this invention are equally suitable for separating nonaqueous liquids or liquids which contract rather than expand upon solidification. Although the general process steps and apparatus are essentially identical with those for handling an aqueous liquid, or a liquid feed mixture which expands upon freezing, some minor changes are necessary particularly in the order in which the steps are carried out. These will become apparent in the following description.

FIG. 14 is a schematic diagram showing the apparatus suitable for separating nonaqueous liquids or liquids which contract upon freezing. It will be seen that when comparing FIG. 14 with FIG. 1, the pressure column, the pressurizing cylinder and the displacing cylinder are identical to those described for FIG. 1. An additional feed cylinder is added to the system and some minor changes are made in the positioning of the heat exchangers.

Turning now to FIG. 14 in which like numbers refer to like elements in FIG. 1, it will be seen that there are provided a pressure column 10 and a pressurizing system which comprises a pressurizing cylinder 12 having piston 11 which is driven through shaft 14 by a suitable driving means 13. The pressurizing cylinder communicates with the pressure column 10 through conduit 21. Similarly as in the case of the apparatus of FIG. 1 there are provided a displacing cylinder 15 having piston 16, driving rod 18 and driving means 17. Because pressure is applied to the contents within the pressure column 10 at different points in this cycle than in the cycle for aqueous liquids, it is convenient to incorporate into that portion of the apparatus designed to introduce the feed liquid an additional feed cylinder 101 which is equipped with a suitable piston 100. This piston is driven by the same rod 18 as drives displacer cylinder piston 16. Thus the movement of pistons 101 and 16 is continually coordinated. In addition, a feed heat exchanger 103, through which coils 104 are passed to carry a heat exchange liquid, is added to adjust the temperature of the feed liquid prior to its introduction into the pressure column 10.

Tracing now the flow of liquid in and out of the system, it will be seen that the feed liquid is introduced by way of conduit 106 while one of the pure products, i.e., the high-melting component which is taken from the upper part of the column is removed through conduit 108. This latter conduit has two branches, branch conduit 109 through which pure product is taken directly from the system and branch conduit 110 through which pure product is handled for storage and subsequent return for washing. This wash liquid is returned through conduit 112 which in turn passes through the make-up heat exchanger 22, the latter being equipped with coils 23 for introduction of heat exchange liquid.

Another portion of the product, which is the low freezing point liquid, is removed from pressure column 10 through conduit 114 which divides into branch conduit 115 communicating with the displacer cylinder 15 and into branch conduit 116 which in turn passes through pressure heat exchanger 20 for out-of-contact heat exchange with product leaving the pressure column 10 by way of conduit 108. In addition, there are provided two auxiliary outlet conduits 117 and 118. These are designed to remove liquids of intermediate compositions. Thus if it is desired to take off liquids whose compositions approximate those intermediate between the bottom and top of the column this can be done through conduits 117 and 118.

A number of valves are provided for controlling the fluid within the conduits and for directing the flow and maintaining the pressure in the pressure column as desired. These valves are numbered 120–128 and their operation and role in the apparatus will become apparent in the following description of the cycle involved.

As in the case of the aqueous liquids the cycle may be divided into four steps, which in this case comprise
  (a) compressing and freezing;
  (b) downward displacement of liquid contents;
  (c) releasing and melting; and
  (d) upward displacement of liquid contents with product removal.

In the description of the cycle the initial state of the system will be chosen as that obtaining after the last of the above steps has taken place. Although in the following description of the cycle the direction of the displacement in the second and fourth steps refers to the motion of the liquid in a column arranged as shown in FIGS. 1 or 14, it may be desirable to reverse the connections of the column end for end and thus reverse the direction of liquid motion in the second and fourth steps. It is, therefore, within the scope of this invention to operate under such reversed conditions when handling liquids which expand or contract with freezing.

The motion of the pressurizing and displacer pistons (as well as the feed cylinder piston) is illustrated in FIG. 15 along with a chart which indicates the condition of each of the valves shown in the apparatus of FIG. 14.

At the initial state of the cycle as described above, valves 121, 123, 124 and 125 are open, while valves 120, 122 and 126 are closed. The pressurizing piston 11 is at the top of its stroke and the entire system is substantially at atmospheric pressure or at a pressure suitable to maintain the contents in a liquid state. The pistons of the displacing and feed cylinders (16 and 101) are at the bottom of their stroke while the displacing cylinder is filled with high melting product which is to be used in washing. The feed cylinder is empty.

In step 1 which is to consist of compression and freezing, valves 122 and 125 are open and valves 120, 121, 123, 124 and 126 are closed. During this step as indicated in FIG. 15 the pressurizing piston is moves downwardly to reach the bottom of its stroke thus raising the pressure in the pressure column 10 and effecting a partial freezing of the contents of the column. That is, the higher melting point liquid forms a solid phase on the surface of the heat storage medium which is present in pressure column 10 as in the case of the apparatus shown in FIG. 1. During this step the contents of the column, including the liquid and the heat transfer medium, are warmed by the latent heat released. The displacing and feed pistons remain at the bottom of their stroke during this step. At the end of the step it will be appreciated that there is present on the surface of the heat storage medium a solid phase containing some occluded liquid impurities.

In step 2 of the cycle (which is designed to effect a displacement of the liquids present) valves 120, 122 and 126 are opened, while valves 121, 123, 124 and 125 are closed. Inasmuch as the displacement of the liquid is to take place in the presence of the solid phase which is immobilized on the heat transfer medium surface, it is necessary to maintain the elevated pressure within the pressure column 10. Therefore the pressurizing piston 11 remains at the bottom of its stroke, with the displacement of the liquid contents of the column is achieved by moving the displacing and feed pistons. This means that displacing piston 16 and feed cylinder piston 100 are gradually raised to the top of their stroke. The high melting product in the displacing cylinder is forced into the top of the column through valve 126 and the make-up heat exchanger 22 where its temperature is suitably adjusted. This material entering through conduit 108 serves as the washing liquid for the solid phase and the material introduced approximates in composition the solid phase immobilized on the heat transfer medium. At the same time, low melting product forced from the bottom of pressure column 10 enters the lower part of the displacing cylinder 15 through conduit 114 and valve 122.

In the case of multi-component mixtures containing more than one low melting component, it may be desirable to draw off a portion of low melting product at an intermediate point such as through conduit 117. In this case it will be appreciated that valve 127 is also open. Simultaneously fresh feed liquid enters the feed cylinder through valve 120 to be stored in the feed cylinder 101. At this point in the cycle it will be appreciated that there is present in pressure column 10 (under high pressure) liquid which is concentrated with respect to the low melting product in the bottom portion, and on the top of it pure high melting product liquid surrounding and washing the solid phase which is immobilized on the heat transfer medium.

In order now to remove the pure high melting product as a liquid, it is of course necessary to melt the solid phase and this is done by releasing the pressure. In the third step of the cycle valves 122 and 126 are opened, while valves 120, 121, 123, 124 and 125 are closed. During this step the pressurizing piston is moved to the top of its stroke, thus releasing the pressure within pressure column 10 and restoring it essentially to the pressure at which the cycle began. With the release of pressure in pressure column 10 the solid phase of the column melts and is reconverted to a liquid, the latent heat of melting being supplied by the cooling of the column contents including the liquid and the heat storage medium. Meanwhile, the displacing and feed pistons have remained at the top of their stroke, displacing cylinder 15 being filled with low melting product liquid, while feed cylinder 101 contains a fresh supply of the liquid feed mixture ready to be supppplied to the pressure column 10.

The final or fourth step of the cycle involves an upward displacement of the liquid contents to achieve removal of the high melting product and introduction of additional liquid feed mixture. To accomplish this, valves 121, 123, 124 and 125 are opened and valves 120, 122 and 126 are closed. Inasmuch as this transfer of liquid is carried out in this cycle at atmospheric pressure, the pressurizing piston remains at the top of its stroke. The displacing and feed pistons are moved to the bottom of their stroke to force the feed liquid contained in the feed cylinder 101 through conduit 106 and heat exchanger 103 into pressure column 10. In heat exchanger 103, the temperature of the feed liquid is adjusted to a suitable value depending upon the nature of the feed liquid.

In the apparatus of FIG. 14 it is seen that the feed liquid is introduced at a point in the column where the composition approximates that of the column contents. It will be appreciated that this may be any point in column 10, depending on the nature of the mixture being separated. With the introduction of the feed liquid in the column 10 an equal volume of the high melting pure product is displaced from the top of the column and withdrawn through conduit 108. A portion of the high melting product is returned to the displacing cylinder through branch conduit 110 by way of pressure heat exchanger 20, the flow being controlled by valve 125. The remaining portion of the pure high melting product is withdrawn through the system by conduit 109, controlled by valve 124, and becomes the high melting product which is withdrawn from the system. In the case of multi-component mixtures containing several high melting components, it may be desirable to withdraw a part of the product at an intermediate point in the column such as through conduit 118 controlled by valve 128. In this case valve 128 will, of course, be open and the control of valves 124 and 128 can be used to control the amount and quality of products withdrawn from the top of the column. Finally the low melting product leaves the lower half of the displacing cylinder 15 through conduits 115 and 116, the flow being controlled by valve 123. This material is passed through pressure heat exchanger 20 for out-of-contact heat exchange with that portion of the high melting point product which is introduced into the top portion of displacing cylinder 15.

With the completion of this step the system is now restored to its initial state and is ready to begin the first step of the cycle again.

The various types of heat storage medium, the apparatus for coordinating the movements of the various pistons and the different means for agitating the liquid in the column which were described above in connection with the apparatus of FIG. 1 are equally applicable to the apparatus of FIG. 14.

It will be seen from the description given above for the two typical operating cycles and the apparatus for carrying out these cycles that this invention provides a novel way of separating two or more noneutectic liquids by taking advantage of the fact that solidification of one of the liquids can be achieved by altering the pressure on the liquid system. By immobilizing the solid phase thus formed it is then possible to achieve a displacement of the liquids surrounding the solid phase, thus interchanging the liquid contents of the column.

The pressures employed in the practice of this invention will, of course, be varied to suit the liquid feed mixture which is to be separated into two or more components. The pressure required is that which will achieve partial solidification of at least one of the components of the liquid mixture and generally the higher the pressures used the more efficient the system will be. The upper limit of pressures employed will normally be determined by the operating characteristics of the equipment employed and by the strength of the pressure column 10 which contains the mixture to which pressure is applied.

Temperatures within the system will also be adjusted to suit the liquids involved in the separation process. It will, of course, be appreciated that where mixtures which are normally solid are to be handled in the molten condition, heat will have to be supplied; while in the case of liquefied gases which are to be separated as liquids it will be necessary to supply suitable refrigeration. It is generally preferable to introduce the liquid into the pressure column 10 at a temperature such that a minimum change of temperature within the pressure column will achieve the necessary solidification and liquefaction.

The apparatus illustrated in FIGS. 1 and 7–14 are, of course, only examples of apparatus which may be used and components may be varied without departing from the scope of this invention. It will be appreciated that many ways are known for pressurizing the column 10, for metering and moving liquids as done by the displacing and feed cylinders illustrated. Any suitable apparatus which is capable of achieving the necessary movement of liquids is suitable for the practice of this invention. Therefore, considerable modification is possible in the process and apparatus of this invention without departing from the essential features of the invention.

We claim:

1. Process for separating in the absence of any vapor phase a noneutectic liquid mixture into at least two components having different freezing points, characterized by the steps of altering the external pressure on said liquid mixture by an amount sufficient to produce a substantial change in the freezing point of said liquid mixture thereby to form a solid phase and a residual liquid, displacing at least a portion of said residual liquid with a liquid the composition of which is more nearly the composition of said solid phase while maintaining said solid phase substantially immobile thereby to remove occluded liquid impurities in said solid phase, altering the external pressure on said mixture to convert said solid phase to a liquid, and removing the resulting liquid components.

2. Process for separating in the absence of any vapor phase a noneutectic feed mixture into at least two components having different freezing points, comprising the steps of introducing said feed mixture into a zone defined by an elongate pressure column at a controlled temperature and pressure such that said noneutectic mixture is all in the liquid state, and then subjecting said column and its contents to the following four steps which make up an operational cycle:

(a) changing the pressure within said column thereby to effect a freezing of a portion of its contents to form within said column a solid phase enriched in the components of said mixture melting at the higher temperature, and a residual liquid;

(b) introducing into said column a quantity of a liquid, the composition of which is more nearly that of said solid phase, and withdrawing a substantially equivalent quantity of said residual liquid thereby moving said residual liquid relative to said solid phase while holding said solid phase substantially immobile and maintaining essentially the same pressure within said column as established in step (a);

(c) changing the pressure within said column thereby to melt substantially all of said solid phase; and (d) introducing a quantity of said feed mixture and withdrawing a quantity of product liquid in a manner to move the liquid contents in a direction opposite to the direction of liquid flow in step (b), thereby establishing within said column the condition required to perform step (a).

3. Process for separating in the absence of any vapor phase a noneutectic liquid mixture into at least two components having different freezing points, said liquid being one which expands upon freezing, comprising the steps of introducing a liquid feed mixture into a zone defined by an elongate pressure column at an elevated pressure sufficient to maintain said feed mixture in a liquid state and subjecting said column and its contents to the following four steps making up an operational cycle:

(a) releasing the pressure within said column thereby to effect a freezing of a portion of its contents to form within said column a solid phase enriched in the components of said mixture melting at the higher temperatures, and a residual liquid;

(b) introducing into said column a quantity of liquid the composition of which is more nearly the composition of said solid phase, and withdrawing a substantially equivalent quantity of said residual liquid, thereby moving said residual liquid relative to said solid phase while holding said solid phase substantially immobile and maintaining essentially the same pressure within said column as established in step (a);

(c) increasing the pressure within said column thereby to melt substantially all of said solid phase; and (d) introducing a quantity of said liquid feed mixture and withdrawing a quantity of product liquid under pressure conditions substantially equivalent to those established in step (c) in a manner to move the liquid contents in a direction opposite to the direction of liquid flow in step (b), thereby establishing within said column the condition required to perform step (a).

4. Process in accordance with claim 3 further characterized by adjusting the temperature of said liquid feed mixture by out-of-contact heat exchange with said product liquid and said residual liquid.

5. Process in accordance with claim 3 further characterized by the step of returning a portion of said product liquid removed in step (d) as the liquid introduced in step (b).

6. A process for separating in the absence of any vapor phase a noneutectic liquid mixture into at least two components having different freezing points, said liquid being one which contracts upon freezing, comprising the steps of introducing a liquid feed mixture into a zone defined by an elongate pressure column at approximately atmospheric pressure and subjecting said column and its contents to the following four steps making up an operational cycle;

(a) increasing the pressure within said column thereby to effect freezing of a portion of its contents to form within said column a solid phase enriched in the components of said mixture melting at the higher temperatures, and a residual liquid;

(b) introducing into said column a quantity of liquid the composition of which is more nearly the composition of said solid phase, and withdrawing a substantially equivalent quantity of said residual liquid thereby moving said residual liquid relative to said solid phase while holding said solid phase substantially immobile and maintaining essentially the same elevated pressure within said column as established in step (a);

(c) releasing the pressure within said column thereby to melt substantially all of said solid phase; and (d) introducing a quantity of said liquid feed mixture and withdrawing a quantity of product liquid at a point in said column corresponding to the location of the desired product composition in a manner to move the liquid contents in a direction opposite to the direction of liquid flow in step (b), thereby establishing within said column the condition required to perform step (a).

References Cited by the Examiner

UNITED STATES PATENTS

| | | | |
|---|---|---|---|
| 1,865,614 | 7/1932 | Caldwell | 62—58 |
| 2,185,940 | 1/1940 | Dudley | 62—100 |
| 2,573,516 | 10/1951 | Van der Mol. | |
| 2,579,421 | 12/1951 | Egan | 62—58 |
| 2,816,822 | 12/1957 | Hess | 23—273 X |
| 2,821,304 | 1/1958 | Zarchin | 62—58 |
| 2,846,292 | 8/1958 | Harper | 23—273 X |
| 2,874,199 | 2/1959 | Tarr. | |
| 2,891,099 | 6/1959 | Skinner | 23—273 X |
| 2,896,419 | 6/1959 | Thompson | 62—123 X |
| 3,073,128 | 1/1963 | Becker | 62—12 |

FOREIGN PATENTS

| | | |
|---|---|---|
| 806,727 | 12/1958 | Great Britain. |
| 841,374 | 7/1960 | Great Britain. |
| 70,507 | 6/1946 | Norway. |

NORMAN YUDKOFF, *Primary Examiner.*

RICHARD A. O'LEARY, *Examiner.*

R. C. STEINMETZ, D. R. MATTHEWS,
*Assistant Examiners.*